United States Patent

Honma et al.

[11] Patent Number: 5,876,270
[45] Date of Patent: Mar. 2, 1999

[54] METHOD AND APPARATUS FOR POLISHING SURFACE OF MAGNETIC RECORDING MEDIUM

[75] Inventors: Takumi Honma; Akihiko Konno, both of Miyagi, Japan

[73] Assignee: Sony Corporation, Tokyo, Japan

[21] Appl. No.: 727,626

[22] PCT Filed: Feb. 28, 1996

[86] PCT No.: PCT/JP96/00470

§ 371 Date: Oct. 25, 1996

§ 102(e) Date: Oct. 25, 1996

[87] PCT Pub. No.: WO96/27188

PCT Pub. Date: Sep. 6, 1996

[30] Foreign Application Priority Data

Feb. 28, 1995 [JP] Japan .................................... 7-040561
Apr. 7, 1995 [JP] Japan .................................... 7-082993
Aug. 25, 1995 [JP] Japan .................................... 7-217924
Sep. 29, 1995 [JP] Japan .................................... 7-254263
Oct. 26, 1995 [JP] Japan .................................... 7-279408

[51] Int. Cl.[6] ...................................................... B24B 21/04
[52] U.S. Cl. ............................................. 451/59; 451/176
[58] Field of Search .............................. 451/59, 176, 168, 451/172

[56] References Cited

U.S. PATENT DOCUMENTS 4,514,937 5/1985 Gehrung et al. ......................... 451/59
4,983,421 1/1991 Mochizuki et al. ..................... 427/130
5,036,629 8/1991 Ishikuro et al. ........................ 451/59
5,669,804 9/1997 Takahashi et al. ..................... 451/168

FOREIGN PATENT DOCUMENTS 63-62656 3/1988 Japan .
3-178034 8/1991 Japan .

*Primary Examiner*—Robert A. Rose
*Attorney, Agent, or Firm*—Hill & Simpson

[57] ABSTRACT

There is disclosed a method and apparatus for polishing a surface of a magnetic recording medium in which a magnetic layer surface of a magnetic tape is brought into contact with a polishing tape which is wound on a contact roll and travelled, and the magnetic tape and the polishing tape are travelled in opposite directions to polish the magnetic layer surface of the magnetic tape. In this invention, in surface polishing, a curvature of the contact roll at a position where the magnetic tape is brought into contact with the polishing tape at first is set to be 0.1 to 10 mm. In order to set the curvature of the contact roll at the position where the magnetic tape is brought into contact with the polishing tape at first to be 0.1 to 10 mm, for example, the curvature of the contact roll is continuously changed. More specifically, in consideration of the sectional shape of the contact blade, first and second curves which have different curvature radii are continuously formed from the supply side of the magnetic tape, and the curvature radius of the first curve is set to be smaller than the curvature radius of the second curve. Otherwise, a composite cylindrical roll having a shape obtained by combining a large-diameter roll and a small-diameter roll to each other is used.

23 Claims, 4 Drawing Sheets

(R3 < R4 < R5 < R6 < R7)

METHOD AND APPARATUS FOR POLISHING SURFACE OF MAGNETIC RECORDING MEDIUM

TECHNICAL FIELD

The present invention relates to a method for polishing a magnetic recording medium using a polishing tape and an apparatus therefore.

BACKGROUND ART

For a magnetic tape such as a video tape or an audio tape, either a so-called coating type magnetic recording medium or a metal thin-film type magnetic recording medium is proposed. That is, according to the former, a magnetic coating material, which is prepared in such a manner that a powdery magnetic material, a binder, and various additives are dispersed and kneaded together with an organic solvent, is coated on a non-magnetic support member and then dried. According to the later, a magnetic layer is formed in such a manner that a metal magnetic material is directly coated on a non-magnetic support member by using a vacuum thin film forming technique.

In this case, a recording/reproducing operation of an information signal with respect to each of these magnetic tapes is performed while the magnetic layer side of the magnetic tape is slidably moved on a magnetic head. For this reason, if surface projections are unexpectedly formed on the magnetic layer surface of the magnetic tape, the surface projections are sheared and broken by slidably moving between the magnetic head and the magnetic tape and are interposed as a fine magnetic powder (to be referred to as an abrasion powder hereinafter) between the magnetic tape and the magnetic head. The abrasion powder interposed between the magnetic tape and the magnetic head causes dropouts, for example, causes image degradation, sound skipping, or the like and, in the worst case, causes head clogging to make it impossible to record/reproduce data.

Therefore, in a conventional magnetic tape described above, a magnetic layer is formed on a non-magnetic support member, and then subjected to a surface process in which the magnetic layer surface is polished with a magnetic tape. A polishing apparatus for performing the surface process is shown in FIG. 1.

The polishing apparatus 101 has a polishing tape 103 and a contact roll 102, having a diameter of about 30 mm, for pushing the polishing tape 103 against the a magnetic tape 104.

The polishing tape 103 is wound on the contact roll 102 at an arbitrary holding angle to cause its polishing layer to face outside. The holding angle of the polishing tape 103 wound on the contact roll 102 is controlled in such a manner that the polishing tape 103 is looped between a pair of winding rolls 105a and 105b arranged parallel to each other near the contact roll 102.

Guide rolls 106a and 106b are arranged on both the sides of the contact roll 102 on which the polishing tape 103 is wound, respectively. The guide rolls 106a and 106b are used to guide the continuously traveling magnetic tape 104 to a position where the magnetic tape 104 is brought into contact with the polishing tape 103 wound on the contact roll 102.

In this polishing apparatus 101, a feeding roll and a take-up roll (not shown) are arranged for each of the polishing tape and the magnetic tape. The end portions of the polishing tape 103 are attached to the feeding roll and the take-up roll, respectively, and the end portions of the magnetic tape 104 are attached to the feeding roll and the take-up roll, respectively.

In the polishing apparatus 101 as described above, when the feeding roll and the take-up roll for the polishing tape and the magnetic tape are rotatably driven, the polishing tape travels in an X direction in FIG. 1, and, in contrast to this, the magnetic tape travels in a Y direction in FIG. 1. In this manner, the magnetic layer surface of the magnetic tape is polished by the polishing tape, and the surface projections on the magnetic layer surface are cut and removed.

However, in the polishing apparatus, when the magnetic tape and the polishing tape are traveled in opposite directions, respectively, air is inserted between the magnetic tape and the polishing tape to form an air film, and the magnetic tape is in incomplete contact with the polishing tape. For this reason, the magnetic layer surface cannot be sufficiently polished by a single process. When a high-quality magnetic tape is to be manufactured, the surface process must be performed a plurality of times to sufficiently polish the magnetic layer surface. Since the thickness of the air film formed between the magnetic tape and the polishing tape increases with a process speed, a process speed is limited to bring the magnetic tape and the polishing tape into sufficient contact with each other. Therefore, the process speed cannot be easily increased. For these reasons, a sufficiently long period of time is required to perform the surface polishing process, thereby preventing productivity of magnetic tapes from being improved.

SUMMARY OF THE INVENTION

It is an object of the present invention to provide a method and apparatus for polishing a surface of a magnetic recording medium, in which a surface process of a magnetic layer can be efficiently performed, and the productivity of magnetic recording media can be improved.

The present invention is proposed to achieve the above object. A surface polishing method of the present invention is characterized in that, when a magnetic layer surface of a magnetic tape is brought into contact with a traveling or moving polishing tape which is wound on a contact roll, and, in this state, the magnetic tape and the polishing tape are traveling or moving in opposite directions to polish the magnetic layer surface of the magnetic tape, setting or controlling a curvature radius or radius of curvature of the contact roll at a position, where the magnetic tape is first brought into contact with the polishing tape to be 0.1 to 10 mm.

A surface polishing apparatus of the present invention includes a contact roll on which a moving polishing tape is wound, and travelling means which brings a magnetic layer surface of a magnetic tape into contact with the polishing tape to move the polishing tape and the magnetic tape in opposite directions, and is characterized by means for setting or controlling the curvature radius or radius of curvature of the contact roll at a position, where the magnetic tape is first brought into contact with the polishing tape, to be 0.1 to 10 mm.

In the surface polishing method and the surface polishing apparatus, the curvature of the contact roll at the position, where the magnetic tape is first brought into contact with the polishing tape, is set to be 0.1 to 10 mm, air is suppressed from being inserted between the polishing tape and the magnetic tape. For this reason, the process speed is set to be relatively high, the polishing tape and the magnetic tape are always brought into preferable contact with each other, and an effective polishing operation can be achieved by a single pass or process. Therefore, the process speed of surface polishing can be increased without repeating surface processing, and a high-quality magnetic recording medium can be manufactured at good rate of productivity.

As a method of setting the radius of curvature of the contact roll at the position, where the magnetic tape is first brought into contact with the polishing tape, to be 0.1 to 10 mm, various methods can be considered. For example, as the first method, a method of continuously changing the curvature of the contact roll is proposed.

More specifically, in consideration of the sectional shape of the contact blade, first and second curves which have different curvature radii are continuously formed from the supply side of the magnetic tape, and the curvature radius of the first curve is set to be smaller than the curvature radius of the second curve.

In this case, the curvature radius of the first curve is set to be 0.1 to 10 mm, and the curvature radius of the second curve is set to be 5 to 50 mm.

The first and second curves may be formed to be a spiral curve whose curvature radius continuously is changed within the range of about 0.1 to 50 mm.

In this case, formation of the air film can be reliably suppressed by one contact blade.

As the second method, a method of using a composite cylindrical roll, which has a shape obtained by combining a large-diameter roll and a small-diameter roll to each other, may be used.

More specifically, a contact roll is constituted as a composite cylindrical roll having a sectional shape obtained by partially overlapping a large circle having a diameter of 10 to 100 mm and a small circle having a diameter of 0.2 to 20 mm. A magnetic tape and a polishing tape are arranged to be first brought into contact with each other at a small circle portion.

As the third method, a method of arranging a plurality (2 to 5) of contact rolls each having a diameter of 0.2 to 20 mm, more preferably, 3 to 10 mm in such a manner the contact rolls are brought into contact with a polishing tape.

At this time, the contact rolls are preferably arranged on the same circumference, for example on the peripheral surface of the large-diameter roll. In addition, the surface roughness of the contact roll is preferably set to be 10 nm or less as a center line average height Ra, and the feeding speed of the polishing tape is preferably set to be 5 to 100 mm/min.

In any cases, when the curvature of the contact roll at a position the magnetic tape is first brought into contact with the polishing tape is set to be 0.1 to 10 mm, degradation of polishing efficiency caused by an air film can be canceled.

DESCRIPTION OF THE PREFERRED EMBODIMENTS

Embodiments of a method and apparatus, for polishing the surface of a magnetic recording medium, to which the present invention is applied, will be described below.

According to the first embodiment, the radius of curvature of a contact roll is continuously changed.

Figure 2:
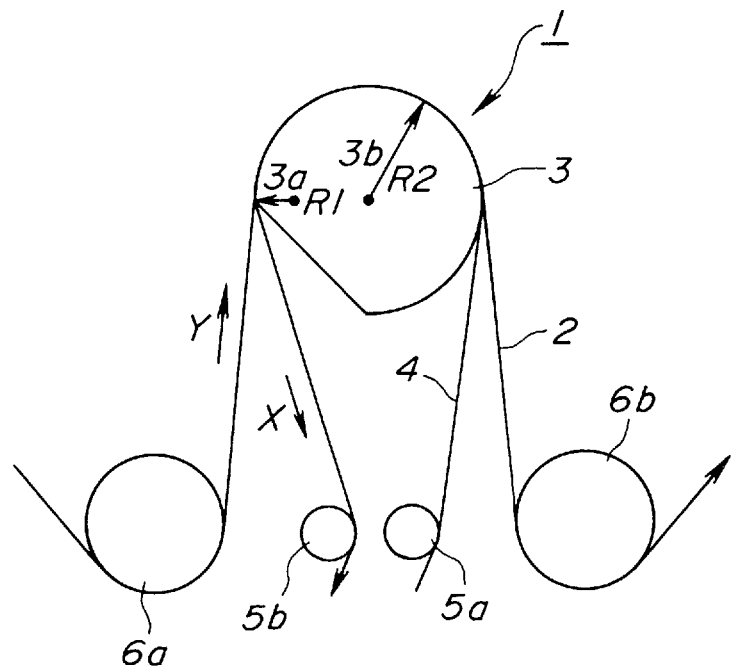
FIG. 2 is a typical view showing an arrangement of a surface polishing apparatus to which the present invention is applied.

A magnetic recording medium surface polishing apparatus 1 according to this embodiment is constituted as follows. That is, as shown in FIG. 2, a magnetic layer formation surface of a magnetic tape 2 is brought into contact with a contact blade 3 corresponding to a contact roll through a wrapping tape 4, and the magnetic tape 2 and the wrapping tape 4 travel in a state wherein the wrapping tape 4 is in contact with the magnetic layer formation surface of the magnetic tape 2.

The wrapping tape 4 is formed such that a polishing agent layer containing a polishing agent is formed on a belt-like non-magnetic support member. As the polishing agent contained in the polishing agent layer, a generally used polishing agent of, e.g., #2,000 to #3,000 may be properly used. A convey path (X direction in FIG. 2) in which the wrapping tape 4 is sequentially supplied from a roll 5a, taken up by a roll 5b, and sequentially conveyed to the contact blade 2 is constituted.

On the other hand, the contact blade 3 is used to slidably contact the wrapping tape 4 on the outer peripheral surface of the magnetic tape 2 on which the magnetic layer is formed.

In particular, the contact blade 3 in this embodiment is of a fixed type, and is formed in such a manner that curvature radii R of the outer peripheral surface are different from each other.

More specifically, in the contact blade 3, a first curve 3a and a second curve 3b whose curvature radii R are different from each other are continuously formed from the supply side of the non-magnetic support member, into the contact blade 3.

Figure 1:
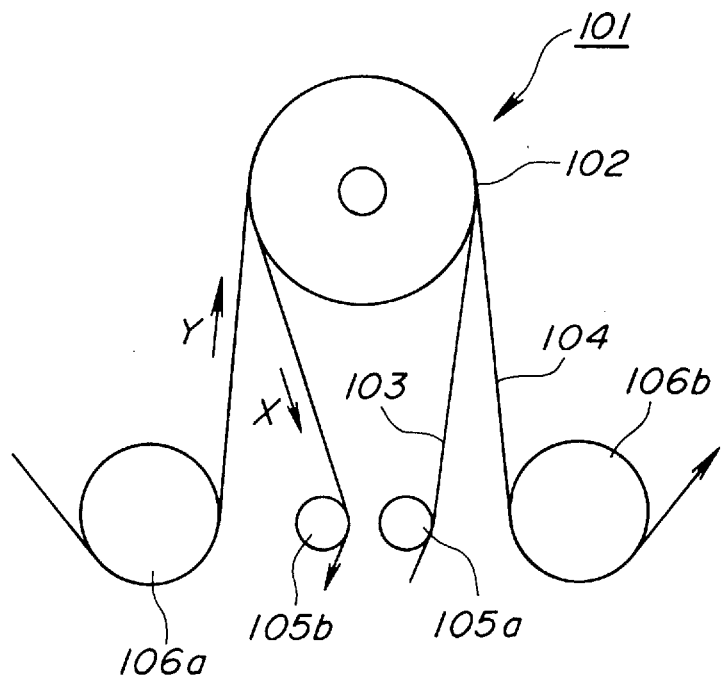
FIG. 1 is a typical view showing the schematic arrangement of a conventional surface polishing apparatus.

For the magnetic tape 2, a convey path (Y direction in FIG. 1) in which the magnetic tape 2 is sequentially conveyed to the contact roll 3 is formed through guide rolls 6a and 6b. Therefore, the curvature radius R1 of the first curve 3a is formed to be smaller than the curvature radius R2 of the second curve 3b in such a manner that the magnetic tape 2 is brought into contact with the first curve 3a having a small curvature radius R when the magnetic tape 2 is supplied to the contact blade 3.

The contact blade 3 is preferably formed such that the curvature radius R1 of the first curve 3a is set to be about 0.1 to 10 mm, and the curvature radius R2 of the second curve 3b is set to be about 5 to 50 mm.

If the curvature radius R2 of the second curve 3b is smaller than 5 mm, a polishing collection effect is short, and surface projections and polishing powder are left on the magnetic layer surface to cause a dropout error (surface defects of the magnetic tape). If the curvature radius R2 of the second curve 3b exceeds 50 mm, scratch flaws may be formed in the magnetic layer surface.

On the other hand, if the curvature radius R1 of the first curve 3a exceeds 10 mm, a polishing effect is short, and remaining surface projections cause a dropout error. The reasons why the lower limit of the curvature radius R1 of the first curve 3a is set to be 0.1 mm is not only that the contact blade 3 cannot be easily manufactured at a high processing precision, but also that the supply angle of the magnetic tape 2 cannot be easily set.

In the surface polishing apparatus 1 having the above arrangement, a holding angle (contact surface) of the magnetic tape 2 with respect to the contact blade 3 can be adjusted by various mechanisms.

For example, the angle of the contact blade 3 is made variable, and the guide rolls 6a and 6b are made movable around the circumference of the contact blade 3, thereby making it possible to adjust the holding angle. The orientation of the contact blade 3 is adjusted in the direction of an arrow D (FIG. 3), and the guide rolls 6a and 6b are moved in the directions of an arrow A and an arrow B on a concentric circle C, thereby adjusting a contact start position between the magnetic tape 2 and the wrapping tape 4 and a contact area of the magnetic tape 2 on the contact blade 3.

Figure 4:
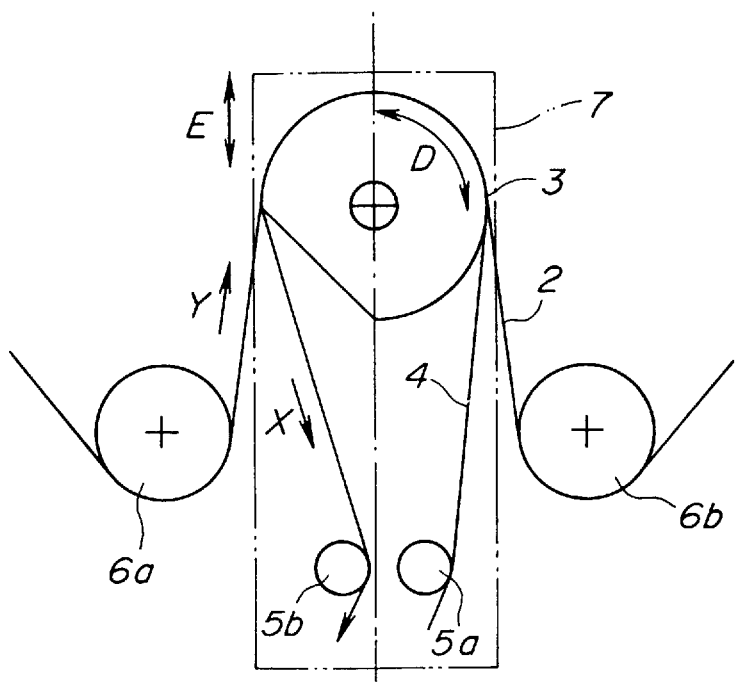
FIG. 4 is a typical view showing another example of a method of adjusting a contact state of a magnetic tape to a polishing tape.

Referring to FIG. 4, the contact blade 3 and the rolls 5a and 5b are fixed to a fixing plate 7 to form a unit, and a pressing amount of the fixing plate 7 is changed to adjust the holding angle and the contact area.

Figure 3:
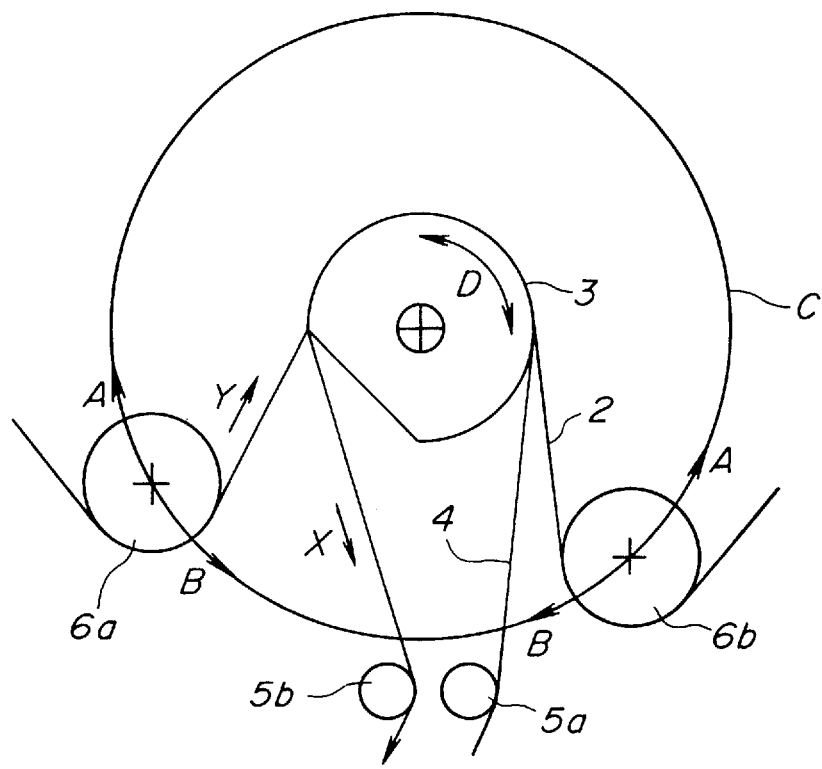
FIG. 3 is a typical view showing an example of a method of adjusting a contact state of a magnetic tape to a polishing tape.

In this case, when the direction of the contact blade 3 is adjusted, and the fixing plate 7 is vertically moved in the direction of an arrow E, the holding angle and the contact area are adjusted in the same manner as in FIG. 3.

In this manner, the magnetic recording medium surface polishing apparatus 1 according to this embodiment is constituted in such a manner that the first curve 3a having a small curvature radius R1 is formed on the supply side of the magnetic tape 2 into the contact blade 3. For this reason, the magnetic tape 2 is fed to the position of the second curve 3b having a large curvature radius R2 in a state wherein formation of an air film is reliably suppressed. Therefore, even if one contact blade having the above arrangement is used, formation of an air film is suppressed. In addition, the speed of the polishing process is increased, thereby preventing a dropout error or a scratch flaw.

An influence of the curvature radii R of the contact blade 3 was examined by using the magnetic recording medium surface polishing apparatus 1 having each of the above arrangements.

Raw materials of the following composition were weighed to prepare a magnetic coating material. More specifically, a magnetic powder was kneaded with a binder to prepare the magnetic coating material, and the resultant magnetic coating material was coated on a base film serving as a non-magnetic support member. The resultant structure was subjected to a calendar process (by surface processing apparatus) to form a magnetic layer.

| | |
|---|---|
| magnetic powder; Co-γ-Fe$_2$O$_3$ | 100 parts by weight |
| binder resin; | 20 parts by weight |
| polyester polyurethane resin | |
| nitrocellulose | |
| polishing agent; Al$_2$O$_3$ | 3 parts by weight |
| additive; carbon powder | 2 parts by weight |
| lubricant; butyl stearate | 1 parts by weight |
| solvent; methyl ethyl ketone | 100 parts by weight |
| toluene | 100 parts by weight |
| cyclohexanone | 50 parts by weight |

The magnetic coating material prepared as described above was formed as a magnetic layer on a base film having a thickness of 14 μm.

The magnetic raw film on which the magnetic layer was formed was cut into tapes each having a width of ½ inch, the polishing process of the magnetic layer surface was formed by using the magnetic recording medium surface polishing apparatus 1 having the above arrangement. In a method of manufacturing a magnetic recording medium, after the polishing process was performed, the cutting step of cutting the film into a predetermined size according to a tape width and the step of testing products were sequentially performed.

As the contact blade 3 of the surface polishing apparatus 1, a contact blade having the curvature radius R1 of the contact blade 3 and the curvature radius R2 of the second curve 3b which were set to be values shown in Table 2. As comparative examples, contact blades respectively having diameters of φ30 mm and φ6 mm were used. In this case, the contact roll having a diameter of φ30 mm was used as the contact roll 102 serving as the cylindrical roll described in the prior art.

As the wrapping tape 4, GC-6000 (trade name) available from Nihon Microcoating Co. Ltd., was used.

The traveling speed of the magnetic tape 2 on which the magnetic layer was formed was changed to 200 m/min, 400 m/min, or 600 m/min.

The magnetic tape 2 which was subjected to the polishing process under the various conditions described above was visually observed to detect the presence/absence of scratch flaws.

The magnetic tape 2 was loaded on a cassette tape deck, and the situation of occurrence of dropout errors were evaluated using a VHS type VTR (available from Matsushita Electric Industrial Co., Ltd.; trade name: AG-6200) and a dropout counter (available from Shibasoku).

The results are shown in Tables 1 and 2 together with the various conditions under which the polishing process is performed.

TABLE 1

| | Curvature Radius of First Curve 3a (mm) | Curvature Radius of Second Curve 3b (mm) | Processing Speed 200 m/min | | Processing Speed 400 m/min | | Processing Speed 600 m/min | |
|---|---|---|---|---|---|---|---|---|
| | | | Dropout | Scratch Flaw | Dropout | Scratch Flaw | Dropout | Scratch Flaw |
| Example 1-1 | 0.1 | 15.0 | ○ | ○ | ○ | ○ | ○ | ○ |
| Example 1-2 | 1.0 | 15.0 | ○ | ○ | ○ | ○ | ○ | ○ |
| Example 1-3 | 1.5 | 15.0 | ○ | ○ | ○ | ○ | ○ | ○ |
| Example 1-4 | 3.0 | 15.0 | ○ | ○ | ○ | ○ | ○ | ○ |
| Example 1-5 | 5.0 | 15.0 | ○ | ○ | ○ | ○ | ○ | ○ |
| Comparative | φ30 | — | Δ | ○ | Δ | ○ | x | ○ |

TABLE 1-continued

|  | Curvature Radius of First Curve 3a (mm) | Curvature Radius of Second Curve 3b (mm) | Processing Speed 200 m/min | | Processing Speed 400 m/min | | Processing Speed 600 m/min | |
| --- | --- | --- | --- | --- | --- | --- | --- | --- |
|  |  |  | Dropout | Scratch Flaw | Dropout | Scratch Flaw | Dropout | Scratch Flaw |
| Example 1-1 | cylindrical roll |  |  |  |  |  |  |  |
| Comparative Example 1-2 | 10.0 | 30.0 | ○ | ○ | Δ | ○ | Δ | ○ |
| Comparative Example 1-3 | 15.0 | 30.0 | ○ | ○ | Δ | ○ | x | ○ |

TABLE 2

|  | Curvature Radius of First Curve 3a (mm) | Curvature Radius of Second Curve 3b (mm) | Processing Speed 200 m/min | | Processing Speed 400 m/min | | Processing Speed 600 m/min | |
| --- | --- | --- | --- | --- | --- | --- | --- | --- |
|  |  |  | Dropout | Scratch Flaw | Dropout | Scratch Flaw | Dropout | Scratch Flaw |
| Example 1-6 | 3.0 | 10.0 | ○ | ○ | ○ | ○ | ○ | ○ |
| Example 1-7 | 3.0 | 30.0 | ○ | ○ | ○ | ○ | ○ | ○ |
| Example 1-8 | 3.0 | 50.0 | ○ | ○ | ○ | ○ | ○ | ○ |
| Comparative Example 1-4 | φ6 cylindrical roll | — | x | x | x | x | x | x |
| Comparative Example 1-5 | 3.0 | 5.0 | Δ | ○ | Δ | ○ | Δ | ○ |
| Comparative Example 1-6 | 3.0 | 60.0 | ○ | x | ○ | x | ○ | x |

In this case, Table 1 shows evaluation results obtained when the curvature radius R2 of the second curve 3b was set to be 15 mm or 60 mm, and the curvature radius R1 of the first curve 3a was variously changed. On the other hand, Table 2 shows evaluation results obtained when the curvature radius R1 of the first curve 3a was fixed to 3 mm, and the curvature radius R2 of the second curve 3b was variously changed.

The situations of occurrence of dropout errors in Tables 1 and 2 was evaluated with reference to the situation of occurrence of dropout error obtained when a cylindrical roll having a diameter of φ30 mm. In Tables 1 and 2, "○" denotes a case wherein the number of dropout errors is smaller than that in the case of a magnetic tape subjected to a polishing process by a conventional method, "Δ" denotes a case wherein the number of dropout errors is equal to that in the case of a magnetic tape subjected to a polishing process by a conventional method, and "x" denotes a case wherein the number of dropout errors is larger than that in the case of a magnetic tape subjected to a polishing process by a conventional method.

In the evaluation results of scratch flaws, "○" denotes a case wherein scratch flaws cannot be visually detected, and "x" denotes a case wherein scratch flaws can be visually detected.

As shown in Table 1, dropout errors are observed when the magnetic tape of Comparative Example 1-1 in which the polishing process is performed directly using the cylindrical roll having a diameter of φ30 mm as a contact roll was traveled on a VTR (Video Tape Recorder). The dropout errors occurs more frequently with an increase in processing speed of the polishing process.

As shown in Table 2, in the magnetic tape of Comparative Example 1-4 in which the polishing process is performed directly using a cylindrical roll having a diameter of φ6 mm as a contact roll, the frequency of occurrence of dropout errors is higher than that in the case of Comparative Example 1, and scratch flaws are visually observed.

For this reason, it is understood that, when the cylindrical roll is directly used as a contact roll, the polishing process cannot be satisfactorily performed.

In contrast to this, as is apparent from Tables 1 and 2, the first curve 3a and the second curve 3b of the contact blade 3 having different curvature radii R are continuously formed from the supply side of the non-magnetic support member 2. When the contact blade 3 in which the curvature radius of the first curve is smaller than the curvature radius of the second curve is used, excellent results with respect to dropout errors and scratch flaws can be obtained compared with Comparative Example 1-1 and Comparative Example 1-4.

As is apparent from Table 1, in Comparative Example 1-2 and Comparative Example 1-3 in which the curvature radius of the first curve 3a exceeded about 10 mm, the polishing process was preferably performed when the speed of the polishing process was 200 m/min. However, when the speed was increased to 400 m/min and 600 m/min, no scratch flaws were observed, but dropout errors were observed.

As is apparent from Table 2, in Comparative Example 1-5 in which the curvature radius of the second curve 3b was 5 mm, no scratch flows were observed, but dropout errors were observed. In Comparative Example 1-6 in which the curvature radius of the second curve 3b exceeded 50 mm, when the speed of the polishing process was increased, no dropout errors were observed, but scratch flaws were observed.

From the above discussion, when the contact blade 3 in which the curvature radius of the first curve is about 0.1 to 10 mm and the curvature radius of the second curve is about 5 to 50 mm is used in the polishing process, the efficient polishing process can be performed even if the speed of the polishing process is increased to 600 m/min, and a high-quality magnetic recording medium is manufactured.

Figure 5:
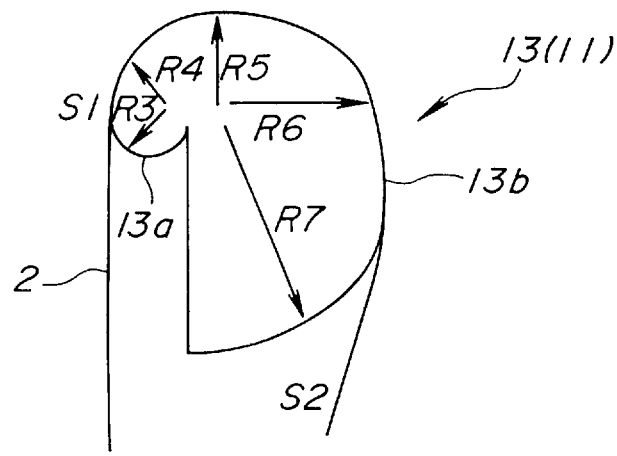
FIG. 5 is a typical view showing an example of a contact roll whose radius of curvature is continuously changed.

In the contact blade 3, although the curvature is changed in two stages, the curvature radius or radius of curvature may be set to be gradually changed. A contact blade in which the curvature radius or radius of curvature is gradually changed is shown in FIG. 5.

In this surface polishing apparatus 11, the radius of curvature or curvature radius (R3, R4, R5, R6, and R7) of a contact blade 13 is continuously changed within the range of about 0.1 to 50 mm. That is, the contact blade 13 is formed as a spiral curve.

More specifically, the contact blade 13 is constituted such that the curvature radius is gradually increased within the range of 0.1 to 50 mm, from a supply side S1 of a magnetic tape 2 to a feeding side S2 of the magnetic tape 2 and thus (R3<R4<R5<R6<R7). The remaining arrangement of the surface polishing apparatus 11 is the same as that in the first embodiment described above.

As in the surface polishing apparatus 11, the magnetic tape 2 is gradually traveled from the supply side S1 (curve 13a portion having a small curvature radius) of the contact blade 13, and is fed to the feeding side S2 of a curve 13b having a large curvature radius R in a state wherein formation of an air film is reliably suppressed. Therefore, formation of an air film can be suppressed, degradation of the magnetic tape quality caused by an increase in the speed of the polishing process does not occur.

In this manner, in this embodiment, a spiral curve in which the curvature radius (R3, R4, R5, R6, and R7) is continuously changed within the range of 0.1 to 50 mm is formed. For this reason, an efficient polishing process can be performed by a more stable traveling of the magnetic tape 2.

According to this embodiment, since the curvature radius of one contact blade 3 is changed depending on an angular position (R3<R4<R5<R6<R7), the following advantages can be obtained. That is, a countermeasure to an air film or the like can be effectively performed by adjusting the supply angle of the magnetic tape 2 or the like, or the depth (amount) of the polishing process can be properly adjusted.

An embodiment in which a composite cylindrical roll having a shape obtained by combining a large-diameter roll and a small-diameter roll will be described below.

Figure 6:
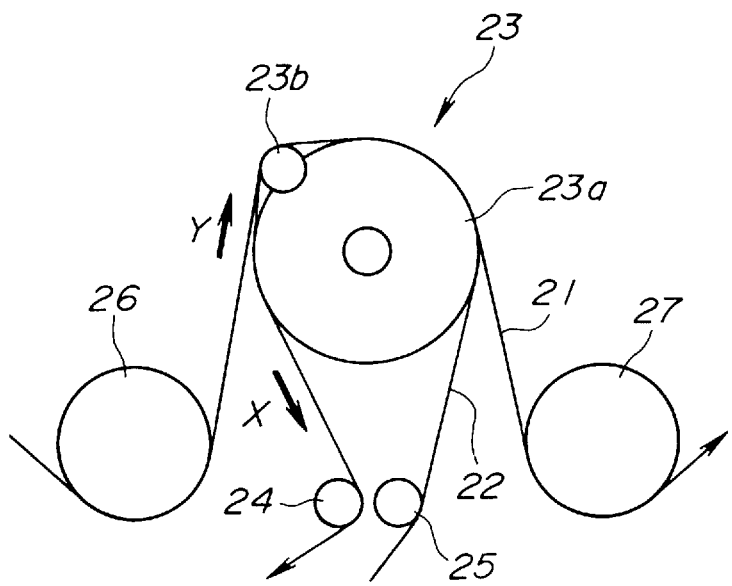
FIG. 6 is a typical view showing another example of the surface polishing apparatus to which the present invention is applied.

In the polishing apparatus of this embodiment, as shown in FIG. 6, a polishing tape 22 is traveling in a direction opposing the direction of a belt-like magnetic tape 21 which continuously travels while the polishing tape 22 is in contact with the magnetic tape 21, thereby polishing the magnetic tape 21. The polishing apparatus has a contact roll 23 for pressing the polishing tape 22 against the magnetic tape 21.

The polishing tape 22 is formed such that a polishing agent layer containing a polishing agent is formed on a belt-like support member. As the polishing agent contained in the polishing agent layer, a generally used polishing agent of, e.g., #2,000 to #10,000 may be properly used.

As the contact roll 23, in this polishing apparatus, especially, a composite cylindrical roll having a sectional shape in which a first circle having a diameter of 10 to 100 mm and a second circle having a diameter of 0.2 to 20 mm partially overlap. More specifically, this composite cylindrical roll has an appearance in which the curved surface of the small-diameter cylindrical roll 23b having the second circle as a section partially overlaps the curved surface of the large-diameter cylindrical roll 23a having the first circle as a section. This contact roll is arranged such that the small-diameter cylindrical roll faces outward on the supply side of the magnetic tape.

The polishing tape 22 is wound on the contact roll 23 at an arbitrary holding angle such that the polishing agent layer faces outside. The holding angle of the polishing tape 22 wound on the contact roll 23 is regulated such that the polishing tape 22 is looped between a pair of winding rolls 24 and 25 parallelly arranged near the contact roll 23.

Guide rolls 26 and 27 are arranged on both the sides of the contact roll 23 on which the polishing tape 22 is wound. The guide rolls 26 and 27 are arranged to guide the magnetic tape 21 which continuously travels to a position where the magnetic tape 21 is brought into contact with the polishing tape 22 wound on the contact roll 23.

In addition, in this polishing apparatus, a feeding roll and a take-up roll (not shown) are arranged for each of the polishing tape and the magnetic tape. The end portions of the polishing tape 22 are attached to the feeding roll and the take-up roll, respectively, and the end portions of the a magnetic tape 21 are attached to the feeding roll and the take-up roll, respectively. In this manner, the polishing tape 22 and the magnetic tape 21 are continuously traveling in opposite directions, respectively.

In order to perform a polishing operation using the polishing apparatus as described above, the feeding roll and the take-up roll for the polishing tape and the magnetic tape are rotatably driven.

When the feeding roll and the take-up roll are rotatably drive, the polishing tape 22 travels in an X direction in FIG. 6, and, in contrast to this, the magnetic tape 21 travels in a Y direction in FIG. 6. In this manner, the magnetic layer surface of the magnetic tape slidably contact the polishing tape.

In this case, if the contact roll is an ordinary cylindrical roll, when the polishing tape and the magnetic tape are continuously moving or traveling as described above, air is inserted between the tapes to form an air film.

In contrast to this, in this polishing apparatus, the contact roll 23 is the composite cylindrical roll having an appearance in which the curved surface of the small-diameter cylindrical roll 23b partially overlaps the curved surface of the large-diameter cylindrical roll 23a. In this case, the curved surface of the small-diameter cylindrical roll 23b functions to push air inserted between the polishing tape 22 and the magnetic tape 21, out from the tapes 21 and 22 between. For this reason, a processing speed is set to be relatively high, the polishing tape 22 is in preferable contact with the magnetic tape 21, effective polishing can be obtained by performing the polishing process once. Therefore, the processing speed can be made high, and the polishing process need not be repeated. As a result, high-quality magnetic recording media can be manufactured at a high rate of productivity.

In the contact roll 23, the diameter of the large-diameter cylindrical roll 23a must be 10 to 100 mm. If the diameter of the large-diameter cylindrical roll 23a is smaller than 10 mm, a lack of polishing effect occurs, surface projections are left on the magnetic layer surface to cause dropout. If the diameter of the large-diameter cylindrical roll 23a exceeds 100 mm, scratch flaws may be formed in the magnetic layer surface. The diameter of the large-diameter cylindrical roll 23a is preferably set within the range of 20 to 100 mm.

On the other hand, the diameter of the small-diameter cylindrical roll 23b must be 0.2 to 20 mm. If the diameter of the small-diameter cylindrical roll 23b exceeds 20 mm, a lack of polishing effect occurs and, surface projections left on the magnetic layer surface cause dropout. The reason why the lower limit of the diameter is set to be 0.2 mm is that a cylindrical roll having a diameter lower than 0.2 mm cannot be easily manufactured due to its processing precision. Note that the diameter of the small-diameter cylindrical roll is preferably set within the range of 3 to 10 mm.

The same experiment as in the previous embodiment was performed to check an effect obtained by using the above-described composite cylindrical roll as a contact roll for surface processing.

As a contact roll of the polishing apparatus, a composite cylindrical roll having a small-diameter cylindrical roll and a large-diameter cylindrical roll whose diameters were values shown in Table 3 or Table 4 was used. As a comparative example, a cylindrical roll having a diameter of 30 mm and a cylindrical roll having a diameter of 6 mm were used.

Evaluation results are shown in Tables 3 and 4 together with the various conditions under which the polishing process is performed.

Note that Table 3 shows evaluation results obtained when the diameter of the large-diameter cylindrical roll was set to be 30 mm or 60 mm, and the diameter of the small-diameter cylindrical roll was variously changed. On the other hand, Table 4 shows evaluation results obtained when the diameter of the small-diameter cylindrical roll was fixed to 6 mm, and the large-diameter cylindrical roll was variously changed.

TABLE 3

|  | Diameter of Small-diameter Cylindrical Roll (mm) | Diameter of Large-diameter Cylindrical Roll (mm) |
|---|---|---|
| Example 2-1 | — | 30 |
| Example 2-2 | 3 | 30 |
| Example 2-3 | 6 | 30 |
| Example 2-4 | 10 | 30 |
| Example 2-5 | 20 | 60 |
| Example 2-6 | 30 | 60 |

|  | Processing Speed 200 m/min | | Processing Speed 400 m/min | | Processing Speed 600 m/min | |
|---|---|---|---|---|---|---|
|  | Drop-out | Scratch Flaw | Drop-out | Scratch Flaw | Drop-out | Scratch Flaw |
| Example 2-1 | Δ | ○ | Δ | ○ | x | ○ |
| Example 2-2 | ○ | ○ | ○ | ○ | ○ | ○ |
| Example 2-3 | ○ | ○ | ○ | ○ | ○ | ○ |
| Example 2-4 | ○ | ○ | ○ | ○ | ○ | ○ |
| Example 2-5 | ○ | ○ | Δ | ○ | Δ | ○ |
| Example 2-6 | Δ | ○ | Δ | ○ | x | ○ |

TABLE 4

|  | Diameter of Small-diameter Cylindrical Roll (mm) | Diameter of Large-diameter Cylindrical Roll (mm) |
|---|---|---|
| Example 3-1 | 6 | — |
| Example 3-2 | 6 | 10 |
| Example 3-3 | 6 | 20 |
| Example 3-4 | 6 | 30 |
| Example 3-5 | 6 | 40 |
| Example 3-6 | 6 | 50 |
| Example 3-7 | 6 | 60 |
| Example 3-8 | 6 | 80 |
| Example 3-9 | 6 | 100 |
| Example 3-10 | 6 | 150 |

|  | Processing Speed 200 m/min | | Processing Speed 400 m/min | | Processing Speed 600 m/min | |
|---|---|---|---|---|---|---|
|  | Drop-out | Scratch Flaw | Drop-out | Scratch Flaw | Drop-out | Scratch Flaw |
| Example 3-1 | x | Δ | x | Δ | x | Δ |
| Example 3-2 | Δ | ○ | Δ | ○ | Δ | ○ |
| Example 3-3 | ○ | ○ | ○ | ○ | ○ | ○ |
| Example 3-4 | ○ | ○ | ○ | ○ | ○ | ○ |
| Example 3-5 | ○ | ○ | ○ | ○ | ○ | ○ |
| Example 3-6 | ○ | ○ | ○ | ○ | ○ | ○ |
| Example 3-7 | ○ | ○ | ○ | ○ | ○ | ○ |
| Example 3-8 | ○ | ○ | ○ | ○ | ○ | ○ |
| Example 3-9 | ○ | ○ | ○ | ○ | ○ | ○ |
| Example 3-10 | ○ | x | ○ | x | ○ | x |

As shown in Table 3, in a magnetic tape of Example 2-1 in which the surface process is performed directly using the large-diameter cylindrical roll having a diameter of 30 mm as a contact roll was traveled on a VTR. The dropout errors occurs frequently with an increase in processing speed of the surface process. In the magnetic tape of Example 3-1 in which the surface process is performed directly using a small-diameter cylindrical roll having a diameter of 6 mm as a contact roll, the frequency of occurrence of dropout errors is higher than that in Example 2-1, and scratch flaws are visually observed.

For this reason, it is understood that even if a cylindrical roll is directly used as a contact roll, a sufficient surface process cannot be performed.

When a surface process is performed using a composite cylindrical roll, in systems (Example 2-2 to Example 2-6) in which the diameter of the large-diameter cylindrical roll is fixed to 30 mm or 60 mm and the diameter of the small-diameter cylindrical roll is variously changed, the diameter of the small-diameter cylindrical roll is set within the range of 3 to 20 mm, and occurrence of dropouts is suppressed. In particular, when the diameter of the small-diameter cylindrical roll is set to be 3 to 10 mm, even if the processing speed of the surface process is increased up to 600 m/min, the number of times of occurrence of dropouts is suppressed to a sufficiently small value.

In systems (Example 3-2 to Example 3-10) in which the diameter of the small-diameter cylindrical roll is fixed to 6 mm and the diameter of the large-diameter cylindrical roll is variously changed, the diameter of the large-diameter cylindrical roll is set within the range of 10 to 100 mm, and occurrence of dropouts is suppressed. In particular, when the diameter of the large-diameter cylindrical roll is set to be 20 to 100 mm, even if the processing speed of the surface process is increased up to 600 m/min, the number of times of occurrence of dropouts is suppressed to a sufficiently small value.

From the above discussion, when the composite cylindrical roll constituted by a small-diameter cylindrical roll of a diameter of 3 to 20 mm and a large-diameter cylindrical roll having a diameter of 10 to 100 mm is used in the surface process, the effective surface process can be performed even if the processing speed is set to be 600 m/min, and a high-quality magnetic recording medium is manufactured.

Finally, an embodiment in which a plurality of small-diameter contact rolls are arranged will be described below.

Figure 7:
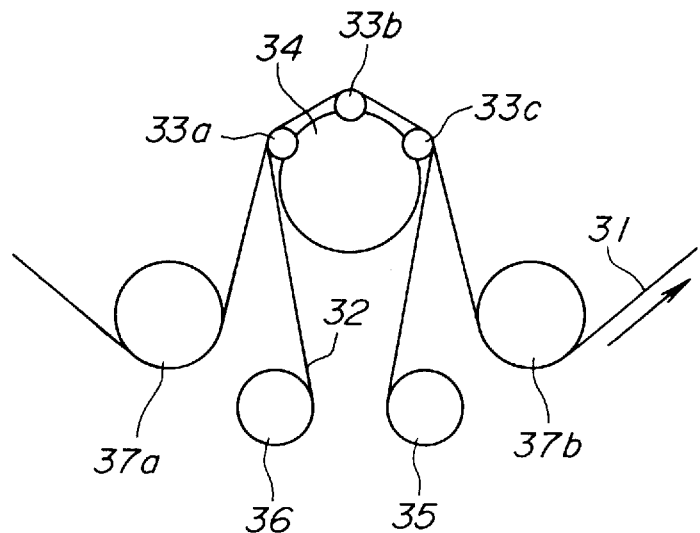
FIG. 7 is a typical view showing still another example of the surface polishing apparatus to which the present invention is applied.

In this surface polishing apparatus, as shown in FIG. 7, a plurality (three in FIG. 7) of contact rolls 33a, 33b, and 33c are arranged at the halfway portion of a path on which a magnetic tape 31 serving as an object to be processed is traveling from the feeding side to the take-up side.

The contact rolls 33a, 33b, and 33c are arranged at predetermined intervals on the peripheral surface of a contact roll support member having a diameter larger than that of each of the contact rolls 33a, 33b, and 33c.

Figure 8:
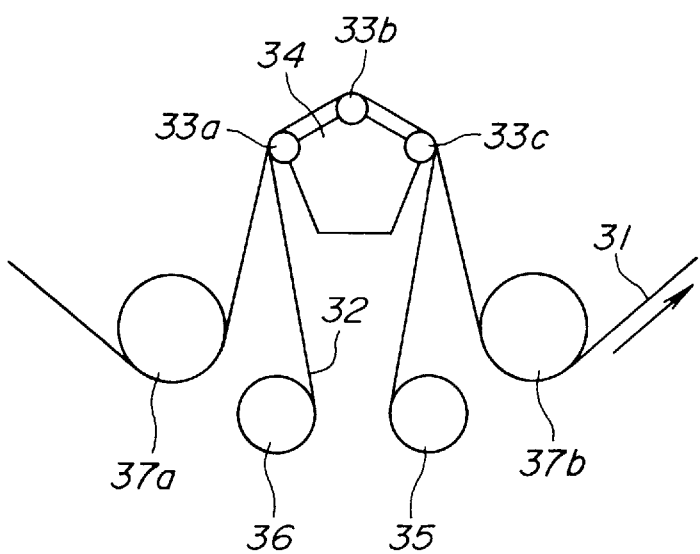
FIG. 8 is a typical view showing another shape of a support member for supporting a plurality of contact rolls.

The contact rolls 33a, 33b, and 33c may be fixed on the peripheral surface of the contact roll support member 34, or may be rotatably attached to the contact roll support member 34. As the shape of the contact roll support member 34, an arbitrary shape may be employed. For example, as in this embodiment, the contact roll support member 34 may have a circular section, or as shown in FIG. 8, a pentagonal section.

A polishing tape 32 fed from a feeding roll 35 which can be rotated clockwise is sequentially supplied between the contact rolls 33a, 33b, and 33c and the magnetic tape 31 which is traveled along the peripheral surfaces of the contact rolls 33a, 33b, and 33c, and the polishing tape 32 is brought into contact with the magnetic tape 31 to perform a surface process to the magnetic tape 31.

Therefore, in this surface processing apparatus, the magnetic tape 31 is traveling along the peripheral surfaces of the contact rolls 33a, 33b, and 33c, and the polishing tape 32 is sequentially traveling from the feeding roll 35 to a take-up roll 36 which can be rotated clockwise, thereby performing a surface process to the magnetic tape 31. An effect of a reduction in dropout can be obtained.

In this case, the diameter of each of the contact rolls 33a, 33b, and 33c is set to be 0.2 mm or more (preferably, 3 mm or more, more preferably, 6 mm or more) and 20 mm or less, and the surface roughness of the contact rolls 33a, 33b, and 33c is 10 nm or less (preferably, 5 nm or less) as a center line average height Ra, the number of contact rolls is set to be 2 or more and 5 or less. In this manner, an insertion amount of an air film between the magnetic tape 31 and the polishing tape 32 is suppressed to the minimum value, and a preferable contact state can be obtained. Therefore, a preferably effect of a reduction in dropout can be obtained, and the quality of the magnetic tape can be improved by an improvement of the surface properties. At the same time, cost can be reduced by an improvement of the surface process efficiency.

Guide rolls 37a and 37b which have diameters larger than those of the contact rolls 33a, 33b, and 33c, are arranged with the roll 37a at the halfway portion of the path on which a magnetic tape 31 is traveling from the feeding side to the contact roll 33a and with the roll 37b at the halfway portion of the path on which a magnetic tape 31 is traveling from the contact roll 33c to the take-up side. The arrangement gives proper tension to the magnetic tape 31 which is traveling from the feeding side to the take-up side and makes it possible to smoothly transport the magnetic tape 31.

Each of the contact rolls 33a, 33b, and 33c, the contact roll support member 34, and the guide rolls 37a and 37b is a cylindrical member having a width which is almost equal to that of the magnetic tape 31. As the material of these members, for example, a metal, a plastic, or the like may be used.

On the other hand, a magnetic tape was manufactured according to the following procedures.

More specifically, raw materials having the following composition were kneaded with a continuous kneader, dispersed using a sand mill, and filtered with a filter having an average aperture of 2 $\mu$m, thereby preparing a magnetic coating material.

| <Composition of Magnetic Coating Material> | |
|---|---|
| magnetic powder: metal magnetic powder (specific surface area BET value = 55 m$^2$/g) | 100 parts by weight |
| binder: polyurethane resin (available from Nippon Polyurethane Industries, Co. Ltd., trade name: N-2304) | 10 parts by weight |
| nitrocellulose (available from Asahi Chemical Industry Co., Ltd., trade name: NC-1/2H) | 7 parts by weight |
| polishing agent: α-Al$_2$O$_3$ (Sumitomo Chemical Co., Ltd., trade name: AKP-30) | 7 parts by weight |
| lubricant: butyl stearate | 3 parts by weight |
| solvent: | |
| methyl ethyl ketone | 80 parts by weight |
| methyl isobutyl ketone | 80 parts by weight |
| toluene | 80 parts by weight |

The raw materials having the above composition were mixed with each other for 48 hours and then filtered with a filter having an average aperture of 1.5 $\mu$m to prepare a coating material for a back coating layer.

| <Composition of Coating Material for Back Coating Layer> | |
|---|---|
| non-magnetic powder: carbon black (available from Colombian Carbon, trade name: RAVEN-1255) | 100 parts by weight |
| binder: polyurethane resin (available from Toyobo Co., Ltd., trade name: UR-8300) | 50 parts by weight |
| solvent: | |
| methyl ethyl ketone | 220 parts by weight |
| methyl isobutyl ketone | 220 parts by weight |
| toluene | 220 parts by weight |

Subsequently, 20 parts by weight of a hardening agent (Colonate L) was added to the coating material for a back coating layer prepared as described above. The coating material for a back coating layer was coated on the rear surface of a polyethylene terephthalate film (Ra=16 nm) having a thickness of 9 $\mu$m to have a thickness of 0.6 $\mu$m.

The magnetic coating material was coated on the other surface of the polyethylene terephthalate film to have a thickness of 2.0 $\mu$m, and subjected to a calendar process and a hardening process.

Furthermore, the magnetic film was cut to have a width of 8 mm, thereby forming a tape.

When the diameters, surface roughnesses, and number of the contact rolls used in the above surface process step were changed as in Table 5, the surface properties and dropouts of each sample tape were examined. The results are shown in Table 5 together with the above conditions. In this case, Ra is kept constant at 10 nm.

The surface of the magnetic tapes after the surface process was observed with an optical microscope to evaluate the surface roughnesses in three stages, i.e., A, B, and C.

A: tape had no scratch flaws, and was preferable;

B: tape had a few scratch flaws, but was usable; and

C: tape had many scratch flaws, and was unusable.

Dropouts were measured using an 8-mm VTR deck for 20 minutes under a condition of −16 dB/3 $\mu$s, and an average value was used. In this case, if the number of dropouts is equal or smaller than 20, a corresponding sample tape can be preferably used.

TABLE 5

|  | Contact Roll Diameter (mm) | Number of Contact Rolls (number) | Surface Roughness Ra (nm) | Dropout x (number) | Scratch Flaw (-) |
| --- | --- | --- | --- | --- | --- |
| Sample 4-1 | 3 | 2 | 10 | 14 | B |
| Sample 4-2 | 3 | 3 | 10 | 8 | B |
| Sample 4-3 | 3 | 5 | 10 | 18 | B |
| Sample 4-4 | 6 | 2 | 10 | 11 | A |
| Sample 4-5 | 6 | 3 | 10 | 7 | A |
| Sample 4-6 | 6 | 4 | 10 | 7 | A |
| Sample 4-7 | 10 | 2 | 10 | 18 | A |
| Sample 4-8 | 10 | 3 | 10 | 17 | A |
| Sample 4-9 | 3 | 1 | 10 | 21 | B |
| Sample 4-10 | 3 | 6 | 10 | 25 | B |
| Sample 4-11 | 12 | 1 | 10 | 23 | B |
| Sample 4-12 | 10 | 2 | 10 | 33 | A |
| Sample 4-13 | unprocessed | | | 89 | A |

As a comparative example, a tape (Sample 4-3) which was not subjected to the above surface process was examined with respect to surface properties and dropouts. The results are also shown in Table 5.

As is apparent from Table 5, as in Samples 4-1 to 4-8, when the diameter of each contact roll used in the surface process was set to be 3 mm or more and 10 mm or less, and the number of contact rolls was set to be 2 or more but 5 or less, a preferable effect of an reduction in the dropout could be obtained. At the same time, formation of the scratch flaws on the tape surface was suppressed, so that the quality of the tape could be improved.

In Samples 4-1 to 4-8, a sufficient effect could be obtained only by performing single surface process step. Therefore, it was found that the surface process step needed not be performed a plurality of time to assure satisfactory surface properties, and the cost could be reduced by and improvement of the processing efficiency.

An influence of the surface roughness of the roll was examined. More specifically, a contact roll diameter and the number of contact rolls were kept constant, and the surface roughness of the contact roll was changed. Under these conditions, the same evaluation as described above was performed. The results are shown in Table 6.

TABLE 6

|  | Contact Roll Diameter (mm) | Number of Contact Rolls (number) | Surface Roughness Ra (nm) | Dropout x (number) | Scratch Flaw (-) |
| --- | --- | --- | --- | --- | --- |
| Sample 4-14 | 6 | 3 | 5 | 7 | A |
| Sample 4-15 | 6 | 3 | 8 | 6 | A |
| Sample 4-16 | 6 | 3 | 10 | 7 | A |
| Sample 4-17 | 6 | 3 | 15 | 8 | C |
| Sample 4-18 | 6 | 3 | 20 | 12 | C |

As is apparent from Table 6, if the center line average height Ra of the contact roll was 10 nm (Samples 4-14 to 4-16), no scratch flaws or a few scratch flaws on the tape were detected. In contrast to this, if the center line average height Ra exceeded 10 nm (Samples 4-17 and 4-18), many scratch flaws were detected on the tape. Therefore, it was found that if the surface properties of the contact roll were made smooth, dust left on the tape which caused formation of scratch flaws could be prevented.

In the surface polishing apparatus described above, if the feeding speed of the polishing tape is 5 mm/min or less, catching capability of catching objects, which causes dropouts by clogging of the polishing tape, is insufficient, and an effect of a reduction in dropout is degraded. If the feeding speed is 100 mm/min or more, fine flaws formed on the magnetic tape surface are detected.

For this reason, the diameters and number of contact rolls were changed as shown in Table 7, and the feeding speed of the polishing tape was kept constant. Under these conditions, the surface properties and dropouts of sample tapes were examined. The results are shown in Table 7 together with the above conditions.

TABLE 7

|  | Contact Roll Diameter (mm) | Number of Contact Rolls (number) | Feeding Speed of Polishing Tape (mm/min.) | Dropout x (number) | Scratch Flaw (-) |
| --- | --- | --- | --- | --- | --- |
| Sample 5-1 | 3 | 2 | 20 | 14 | B |
| Sample 5-2 | 3 | 3 | 20 | 8 | B |
| Sample 5-3 | 3 | 5 | 20 | 18 | B |
| Sample 5-4 | 6 | 2 | 20 | 11 | A |
| Sample 5-5 | 6 | 3 | 20 | 7 | A |
| Sample 5-6 | 6 | 4 | 20 | 7 | A |
| Sample 5-7 | 10 | 2 | 20 | 18 | A |
| Sample 5-8 | 10 | 3 | 20 | 17 | A |
| Sample 5-9 | 3 | 1 | 20 | 21 | B |
| Sample 5-10 | 3 | 6 | 20 | 25 | B |
| Sample 5-11 | 12 | 1 | 20 | 23 | B |

As is apparent from Table 7, if the feeding speed of the polishing tape was set to be 20 mm/min, as in Samples 5-1 to 5-8, when the diameter of the contact roll used in the surface process was set to be 3 mm or more but 10 mm or less, and the number of contact rolls is set to be 2 or more but 5 or less, a preferable effect of a reduction in dropout can be obtained. At the same time the, formation of scratch flaws on the tape surface was suppressed, so that the quality of the tape could be improved.

In Samples 5-1 to 5-8, a sufficient effect could be obtained only by performing the single surface process step. Therefore, it was found that, unlike the prior art, the surface process step need not be performed a plurality of time to assure satisfactory surface properties, and the cost can be reduced by improvement of the processing efficiency.

An influence of the feeding speed of the polishing tape was examined. More specifically, a contact roll diameter and the number of contact rolls were kept constant, and the feeding speed of the polishing tape was changed. Under these conditions, the same evaluation as described above was performed. The results are shown in Table 8.

TABLE 8

|  | Contact Roll Diameter (mm) | Number of Contact Rolls (number) | Feeding Speed of Polishing Tape (mm/min.) | Dropout x (number) | Scratch Flaw (-) |
| --- | --- | --- | --- | --- | --- |
| Sample 5-12 | 6 | 3 | 5 | 17 | B |
| Sample 5-13 | 6 | 3 | 10 | 12 | A |
| Sample 5-14 | 6 | 3 | 50 | 12 | A |
| Sample 5-15 | 6 | 3 | 80 | 16 | B |
| Sample 5-16 | 6 | 3 | 100 | 19 | B |
| Sample 5-17 | 6 | 3 | 3 | 31 | B |
| Sample 5-18 | 6 | 3 | 150 | 26 | B |

As is apparent from Table 8, if the feeding speed of the polishing tape was 5 mm/min or more but 100 mm/min or less (Samples 5-12 to 5-16), no scratch flaws or a few scratch flaws on the tape were detected. In contrast to this, if the feeding speed of the polishing tape was 5 mm/min or less (Sample 5-17) or 100 mm/min or more (Sample 5-18), many scratch flaws were detected on the tape. Therefore, it was found that processing conditions were optimized by setting the feeding speed of the polishing tape to be 5 mm/min or more and 100 mm/min or less, and the high quality of the magnetic tape and a reduction in cost could be obtained at once.

What is claimed is:

1. A surface polishing method for a magnetic recording medium, said method comprising providing a contact roll with a surface, setting a position on the surface with a radius of curvature set to be in a range between 0.1 mm and 10 mm, winding a polishing tape around the surface of the contact roll in a first direction, winding a magnetic tape in a second direction opposite to the first direction and around the surface and polishing tape with a magnetic layer surface of the moving magnetic tape in contact with the moving polishing tape with the first contact being at said position to polish the magnetic surface of said magnetic tape.

2. A surface polishing method for a magnetic recording medium according to claim 1, wherein the contact roll has a first and second curved surface with different radii of curvature continuously formed from a supply side of said magnetic tape, said radius of curvature of the first curved portion being set to be smaller than the radius of curvature of the second curved surface.

3. A surface polishing method for a magnetic recording medium according to claim 2, wherein the radius of curvature of the first curve is set to be in a range of 0.1 mm to 10 mm and the radius of curvature of the second curve is set to be in a range of 5 mm to 50 mm.

4. A surface polishing method for a magnetic recording medium according to claim 1, wherein the contact roll has a spiral curve, whose radius of curvature is continuously changing within a range of 0.1 mm to 50 mm.

5. A surface polishing method for a magnetic recording medium according to claim 1, wherein the contact roll is formed by a composite cylindrical roll having a sectional shape obtained by partially overlapping a first circle having a diameter in a range of 10 mm to 100 mm and a second circle having a diameter of 0.2 mm to 20 mm.

6. A surface polishing method for a magnetic recording medium according to claim 1, wherein the contact roll is formed by two to five contact rolls each having a diameter of not less than 0.2 mm and not more than 20 mm arranged in a space relationship.

7. A surface polishing method for a magnetic recording medium according to claim 1, wherein the contact roll has a surface roughness RA of not more than 10 mm as a center line average height RA.

8. A surface polishing method for a magnetic recording medium according to claim 1, wherein the speed for moving the polishing tape is set to be in a range of not less than 5 mm/min. and not greater than 100 mm/min.

9. In a surface polishing apparatus for a magnetic recording medium comprising a contact roll with a curved surface, means for winding a moving polishing tape on said curved surface of the contact roll and means for winding a magnetic tape around the contact roll to bring a magnetic surface of the magnetic tape into contact with the polishing tape and moving the magnetic tape in a direction opposite to the moving polishing tape, the improvements comprising means for setting a radius of curvature of said contact roll at a position where said magnetic tape is first brought into contact with said contact roll through said polishing tape to be in a range of 0.1 mm to 10 mm.

10. In a surface polishing apparatus according to claim 9, wherein the contact roll has a first curved portion followed by a second curved portion in a direction of movement of the magnetic tape, said first portion having a smaller radius of curvature than the second curved portion.

11. In a surface polishing apparatus according to claim 10, wherein the radius of curvature of the first curved portion is set to be in a range of 0.1 mm to 10 mm and the radius of curvature of a second curved portion is set to be 10 mm to 50 mm.

12. In a surface polishing apparatus according to claim 9, wherein the contact roll has a curved surface following a spiral curve, whose radius of curvature is continuously changing within a range of 0.1 mm to 50 mm.

13. In a surface polishing apparatus according to claim 9, wherein the contact roll is formed as a composite cylindrical roll having a sectional shape obtained by partially overlapping a first circle having a diameter in a range of 10 mm to 100 mm and a second circle having a diameter in a range of 0.2 mm to 20 mm.

14. In a surface polishing apparatus according to claim 13, wherein the diameter of the first circle is set to be larger than the diameter of the second circle.

15. In a surface polishing apparatus according to claim 13, wherein the contact roll is arranged so that a cylindrical portion having the first circle as a section faces a supply side for said magnetic tape.

16. In a surface polishing apparatus according to claim 9, wherein the contact roll is formed by two to five individual contact rollers spaced on a support, each of said individual contact rollers having a diameter of not less than 0.2 mm and not more than 20 mm.

17. In a surface polishing apparatus according to claim 16, wherein said contact rollers are arranged on the same circumference of the support.

18. In a surface polishing apparatus according to claim 17, wherein said contact rollers are arranged on a circumference of a large diameter roll.

19. In a surface polishing apparatus according to claim 9, wherein the surface roughness RA of said contact roll is not more than 10 mm as a center line average height RA.

20. In a surface polishing apparatus according to claim 9, wherein the feeding speed for said polishing tape is in a range of not less than 5 mm/min. and not more than 100 mm/min.

21. In a surface polishing apparatus according to claim 9, wherein a supply angle of said magnetic tape into said contact roll is adjustable.

22. In a surface polishing apparatus according to claim 21, wherein the supply angle is adjusted by a pivoting operation of said contact rolls.

23. In a surface polishing apparatus according to claim 21, wherein the supply angle is adjusted by means moving the guide rolls for guiding said magnetic tape onto the contact roll.

* * * * *